(12) United States Patent
Ryu et al.

(10) Patent No.: US 10,616,178 B2
(45) Date of Patent: Apr. 7, 2020

(54) INFORMATION PROCESSING APPARATUS AND ROUTE CONTROLLING METHOD

(71) Applicant: FUJITSU LIMITED, Kawasaki-shi, Kanagawa (JP)

(72) Inventors: Kouichirou Ryu, Numazu (JP); Naoya Shimazu, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/966,580

(22) Filed: Apr. 30, 2018

(65) Prior Publication Data
US 2018/0332000 A1    Nov. 15, 2018

(30) Foreign Application Priority Data

May 15, 2017    (JP) .................................. 2017-096243

(51) Int. Cl.
*H04L 29/12*    (2006.01)
*H04L 29/14*    (2006.01)
*H04L 12/707*    (2013.01)
*H04L 12/70*    (2013.01)
*H04L 12/703*    (2013.01)

(52) U.S. Cl.
CPC .......... *H04L 61/2007* (2013.01); *H04L 45/22* (2013.01); *H04L 69/40* (2013.01); *H04L 45/28* (2013.01); *H04L 2012/5621* (2013.01)

(58) Field of Classification Search
CPC ................................ H04L 45/22; H04L 45/28
See application file for complete search history.

(56) References Cited

U.S. PATENT DOCUMENTS

| | | | | |
|---|---|---|---|---|
| 2005/0105543 | A1* | 5/2005 | Ikenaga | H04L 29/12367 370/428 |
| 2005/0213558 | A1* | 9/2005 | Levit | H04L 12/42 370/351 |
| 2007/0104198 | A1* | 5/2007 | Kalluri | H04L 45/04 370/392 |
| 2012/0082110 | A1* | 4/2012 | Su | H04L 45/00 370/329 |

FOREIGN PATENT DOCUMENTS

JP    8-251227    9/1996

* cited by examiner

*Primary Examiner* — Angel T Brockman
(74) *Attorney, Agent, or Firm* — Xsensus LLP

(57) ABSTRACT

An information processing apparatus includes a memory and one processor configured to allocate a virtual Internet Protocol address to an application, transmit information including a first metric value and the virtual Internet Protocol address to a network apparatus on a first route through which a first packet destined for the virtual Internet Protocol address is transferred; and transmit information including a second metric value and the virtual Internet Protocol address to another network apparatus on a second route through which a second packet destined for the virtual Internet Protocol address is transferred wherein a certain value is to be added to the first metric value in the network apparatus and another certain value is to be added to the second metric value in the other network apparatus.

14 Claims, 26 Drawing Sheets

FIG. 2

| IP ADDRESS | IP ADDRESS OF NEXT HOP | METRIC VALUE |
|---|---|---|
| VIRTUAL IP ADDRESS a | IP ADDRESS r12 | 7(6+1) |
| VIRTUAL IP ADDRESS b | IP ADDRESS r12 | 7(6+1) |
| VIRTUAL IP ADDRESS a | IP ADDRESS r22 | 8(7+1) |
| VIRTUAL IP ADDRESS b | IP ADDRESS r22 | 8(7+1) |

FIG. 3A

| IP ADDRESS | METRIC VALUE |
|---|---|
| VIRTUAL IP ADDRESS a | 6 |
| VIRTUAL IP ADDRESS b | 6 |

FIG. 3B

| IP ADDRESS | METRIC VALUE |
|---|---|
| VIRTUAL IP ADDRESS a | 7 |
| VIRTUAL IP ADDRESS b | 7 |

FIG. 4

| IP ADDRESS | METRIC VALUE |
|---|---|
| VIRTUAL IP ADDRESS a | 5 |
| VIRTUAL IP ADDRESS b | 5 |

FIG. 5A

| IP ADDRESS | IP ADDRESS OF NEXT HOP | METRIC VALUE |
|---|---|---|
| VIRTUAL IP ADDRESS a | REAL IP ADDRESS m1 | 6(5+1) |
| VIRTUAL IP ADDRESS b | REAL IP ADDRESS m1 | 6(5+1) |

FIG. 5B

| IP ADDRESS | IP ADDRESS OF NEXT HOP | METRIC VALUE |
|---|---|---|
| VIRTUAL IP ADDRESS a | REAL IP ADDRESS m1 | 7(5+2) |
| VIRTUAL IP ADDRESS b | REAL IP ADDRESS m1 | 7(5+2) |

FIG. 6

| IP ADDRESS | IP ADDRESS OF NEXT HOP | METRIC VALUE |
|---|---|---|
| VIRTUAL IP ADDRESS a | IP ADDRESS r12 | 7(6+1) |
| VIRTUAL IP ADDRESS b | IP ADDRESS r22 | 7(6+1) |
| VIRTUAL IP ADDRESS a | IP ADDRESS r22 | 8(7+1) |
| VIRTUAL IP ADDRESS b | IP ADDRESS r12 | 8(7+1) |

FIG. 7A

| IP ADDRESS | METRIC VALUE |
|---|---|
| VIRTUAL IP ADDRESS a | 6 |
| VIRTUAL IP ADDRESS b | 7 |

FIG. 7B

| IP ADDRESS | METRIC VALUE |
|---|---|
| VIRTUAL IP ADDRESS a | 7 |
| VIRTUAL IP ADDRESS b | 6 |

FIG. 8

| IP ADDRESS | METRIC VALUE |
|---|---|
| VIRTUAL IP ADDRESS a | 5 |
| VIRTUAL IP ADDRESS b | 5 |

FIG. 9A

| IP ADDRESS | IP ADDRESS OF NEXT HOP | METRIC VALUE |
|---|---|---|
| VIRTUAL IP ADDRESS a | REAL IP ADDRESS m1 | 6(5+1) |
| VIRTUAL IP ADDRESS b | REAL IP ADDRESS m1 | 7(5+2) |

FIG. 9B

| IP ADDRESS | IP ADDRESS OF NEXT HOP | METRIC VALUE |
|---|---|---|
| VIRTUAL IP ADDRESS a | REAL IP ADDRESS m1 | 7(5+2) |
| VIRTUAL IP ADDRESS b | REAL IP ADDRESS m1 | 6(5+1) |

FIG. 13A

| IP ADDRESS | TRANSMISSION ROUT OF RIP DATA | | METRIC VALUE | REMARKS |
|---|---|---|---|---|
| | TRANSMISSION SOURCE IP ADDRESS | TRANSMISSION DESTINATION IP | | |
| VIRTUAL IP ADDRESS a | REAL IP ADDRESS m1 | IP ADDRESS r11 | 5 | PRIMARY SYSTEM |
| VIRTUAL IP ADDRESS a | REAL IP ADDRESS m1 | IP ADDRESS r21 | 6 | SUB SYSTEM |
| VIRTUAL IP ADDRESS b | REAL IP ADDRESS m1 | IP ADDRESS r11 | 6 | SUB SYSTEM |
| VIRTUAL IP ADDRESS b | REAL IP ADDRESS m1 | IP ADDRESS r21 | 5 | PRIMARY SYSTEM |
| VIRTUAL IP ADDRESS c | REAL IP ADDRESS m2 | IP ADDRESS r31 | 5 | PRIMARY SYSTEM |
| VIRTUAL IP ADDRESS c | REAL IP ADDRESS m3 | IP ADDRESS r41 | 6 | SUB SYSTEM |

FIG. 13B

| IP ADDRESS | TRANSMISSION SOURCE IP ADDRESS OF RIP DATA | TRANSMISSION DESTINATION IP ADDRESS OF RIP DATA | METRIC VALUE |
|---|---|---|---|
| | | | |

FIG. 14

| IP ADDRESS | STATE |
|---|---|
| VIRTUAL IP ADDRESS a | COMMUNICATION ENABLED |
| VIRTUAL IP ADDRESS b | COMMUNICATION ENABLED |
| VIRTUAL IP ADDRESS c | COMMUNICATION DISABLED |

FIG. 17A

| IP ADDRESS | METRIC VALUE |
|---|---|
| VIRTUAL IP ADDRESS a | 5 |
| VIRTUAL IP ADDRESS b | 6 |

FIG. 17B

| IP ADDRESS | METRIC VALUE |
|---|---|
| VIRTUAL IP ADDRESS a | 6 |
| VIRTUAL IP ADDRESS b | 5 |

FIG. 17C

| IP ADDRESS | METRIC VALUE |
|---|---|
| VIRTUAL IP ADDRESS c | 5 |

FIG. 17D

| IP ADDRESS | METRIC VALUE |
|---|---|
| VIRTUAL IP ADDRESS c | 6 |

FIG. 18A

| IP ADDRESS | IP ADDRESS OF NEXT HOP | METRIC VALUE |
|---|---|---|
| VIRTUAL IP ADDRESS a | REAL IP ADDRESS m1 | 6(5+1) |
| VIRTUAL IP ADDRESS b | REAL IP ADDRESS m1 | 7(6+1) |

FIG. 18B

| IP ADDRESS | IP ADDRESS OF NEXT HOP | METRIC VALUE |
|---|---|---|
| VIRTUAL IP ADDRESS a | REAL IP ADDRESS m1 | 7(6+1) |
| VIRTUAL IP ADDRESS b | REAL IP ADDRESS m1 | 6(5+1) |

FIG. 18C

| IP ADDRESS | IP ADDRESS OF NEXT HOP | METRIC VALUE |
|---|---|---|
| VIRTUAL IP ADDRESS c | REAL IP ADDRESS m2 | 6(5+1) |

FIG. 18D

| IP ADDRESS | IP ADDRESS OF NEXT HOP | METRIC VALUE |
|---|---|---|
| VIRTUAL IP ADDRESS c | REAL IP ADDRESS m3 | 7(6+1) |

FIG. 19A

| IP ADDRESS | METRIC VALUE |
|---|---|
| VIRTUAL IP ADDRESS a | 6 |
| VIRTUAL IP ADDRESS b | 7 |

FIG. 19B

| IP ADDRESS | METRIC VALUE |
|---|---|
| VIRTUAL IP ADDRESS a | 7 |
| VIRTUAL IP ADDRESS b | 6 |

FIG. 19C

| IP ADDRESS | METRIC VALUE |
|---|---|
| VIRTUAL IP ADDRESS c | 6 |

FIG. 19D

| IP ADDRESS | METRIC VALUE |
|---|---|
| VIRTUAL IP ADDRESS c | 7 |

FIG. 20

| IP ADDRESS | IP ADDRESS OF NEXT HOP | METRIC VALUE | |
|---|---|---|---|
| VIRTUAL IP ADDRESS a | IP ADDRESS r12 | 7(6+1) | ⎫ |
| VIRTUAL IP ADDRESS b | IP ADDRESS r22 | 7(6+1) | ⎬ PRIMARY SYSTEM |
| VIRTUAL IP ADDRESS c | IP ADDRESS r32 | 7(6+1) | ⎭ |
| VIRTUAL IP ADDRESS a | IP ADDRESS r22 | 8(7+1) | ⎫ |
| VIRTUAL IP ADDRESS b | IP ADDRESS r12 | 8(7+1) | ⎬ SUB SYSTEM |
| VIRTUAL IP ADDRESS c | IP ADDRESS r42 | 8(7+1) | ⎭ |

FIG. 22

| IP ADDRESS | TRANSMISSION ROUT OF RIP DATA | | METRIC VALUE | REMARKS |
| --- | --- | --- | --- | --- |
| | TRANSMISSION SOURCE IP ADDRESS | TRANSMISSION DESTINATION IP ADDRESS | | |
| IP ADDRESS r81 | REAL IP ADDRESS m4 | IP ADDRESS r61 | 5 | PRIMARY SYSTEM |
| IP ADDRESS r81 | REAL IP ADDRESS m4 | IP ADDRESS r71 | 6 | SUB SYSTEM |
| IP ADDRESS r91 | REAL IP ADDRESS m4 | IP ADDRESS r61 | 6 | SUB SYSTEM |
| IP ADDRESS r91 | REAL IP ADDRESS m4 | IP ADDRESS r71 | 5 | PRIMARY SYSTEM |

FIG. 23

| IP ADDRESS | METRIC VALUE |
|---|---|
| IP ADDRESS r81 | 1 |
| IP ADDRESS r91 | 1 |

FIG. 24

| IP ADDRESS | IP ADDRESS OF NEXT HOP | METRIC VALUE |
|---|---|---|
| IP ADDRESS r81 | IP ADDRESS r51 | 2(1+1) |
| IP ADDRESS r91 | IP ADDRESS r51 | 2(1+1) |

FIG. 25A

| IP ADDRESS | METRIC VALUE |
|---|---|
| IP ADDRESS r81 | 5 |
| IP ADDRESS r91 | 6 |

FIG. 25B

| IP ADDRESS | METRIC VALUE |
|---|---|
| IP ADDRESS r81 | 6 |
| IP ADDRESS r91 | 5 |

FIG. 26A

| IP ADDRESS | IP ADDRESS OF NEXT HOP | METRIC VALUE |
|---|---|---|
| IP ADDRESS r81 | REAL IP ADDRESS m4 | 6(5+1) |
| IP ADDRESS r91 | REAL IP ADDRESS m4 | 7(6+1) |

FIG. 26B

| IP ADDRESS | IP ADDRESS OF NEXT HOP | METRIC VALUE |
|---|---|---|
| IP ADDRESS r81 | REAL IP ADDRESS m4 | 7(6+1) |
| IP ADDRESS r91 | REAL IP ADDRESS m4 | 6(5+1) |

INFORMATION PROCESSING APPARATUS AND ROUTE CONTROLLING METHOD

CROSS-REFERENCE TO RELATED APPLICATION

This application is based upon and claims the benefit of priority of the prior Japanese Patent Application No. 2017-96243, filed on May 15, 2017, the entire contents of which are incorporated herein by reference.

FIELD

The present technology relates to a controlling technology of a communication route.

BACKGROUND

There is an information processing apparatus having a plurality of virtual Internet Protocol (IP) addresses. Each of the virtual IP addresses is allocated, for example, to an application to be executed by the information processing apparatus, and a different information processing apparatus, a terminal or the like may communicate with the application by transmitting a packet destined for the virtual IP address.

A certain document discloses a technology for transferring a packet using a routing table generated in compliance with a routing information protocol (RIP) that is a protocol for routing control. For example, a related technology is disclosed in Japanese Laid-open Patent Publication No. 8-251227.

SUMMARY

According to an aspect of the embodiments, an information processing apparatus includes a memory and one processor configured to allocate a virtual Internet Protocol address to an application, transmit information including a first metric value and the virtual Internet Protocol address to a network apparatus on a first route through which a first packet destined for the virtual Internet Protocol address is transferred; and transmit information including a second metric value and the virtual Internet Protocol address to another network apparatus on a second route through which a second packet destined for the virtual Internet Protocol address is transferred wherein a certain value is to be added to the first metric value in the network apparatus and another certain value is to be added to the second metric value in the other network apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a view depicting an example of a routing table;

FIGS. 3A and 3B are views depicting examples of RIP data;

FIG. 4 is a view depicting an example of RIP data;

FIGS. 5A and 5B are views depicting examples of routing tables;

FIG. 6 is a view depicting an example of a routing table;

FIGS. 7A and 7B are views depicting examples of RIP data;

FIG. 8 is a view depicting an example of RIP data;

FIGS. 9A and 9B are views depicting examples of routing tables;

FIG. 13A is a view depicting an example of data stored in a RIP controlling data storage unit in the first embodiment;

FIG. 13B is a view depicting an example of a definition body;

FIG. 14 is a view depicting an example of data stored in a state data storage unit;

FIGS. 17A to 17D are views depicting examples of RIP entries transmitted from an information processing apparatus to a router;

FIGS. 18A to 18D are views depicting examples of routing information a router has;

FIGS. 19A to 19D are views depicting examples of RIP entries transmitted from a router to another router;

FIG. 20 is a view depicting an example of routing information a router has;

FIG. 22 is a view depicting an example of data stored in a RIP controlling data storage unit in the second embodiment;

FIG. 23 is a view depicting an example of a RIP entry transmitted from a router to an information processing apparatus;

FIG. 24 is a view depicting an example of a routing table managed by an information processing apparatus;

FIGS. 25A and 25B are views depicting examples of RIP entries transmitted from an information processing apparatus to a router; and FIGS. 26A and 26B are views depicting routing tables routers have.

DESCRIPTION OF EMBODIMENTS

In the case where a plurality of communication routes are available between an information processing apparatus and a different information processing apparatus, if communication may be performed such that a route different for each virtual IP address is used, it may be suppressed that the network traffic is concentrated on a specific route. However, the related technology is not suitable for allocation of a communication route to a plurality of virtual IP addresses.

First Embodiment

First, a technology for controlling a route utilizing a RIP is described.

Figure 1:
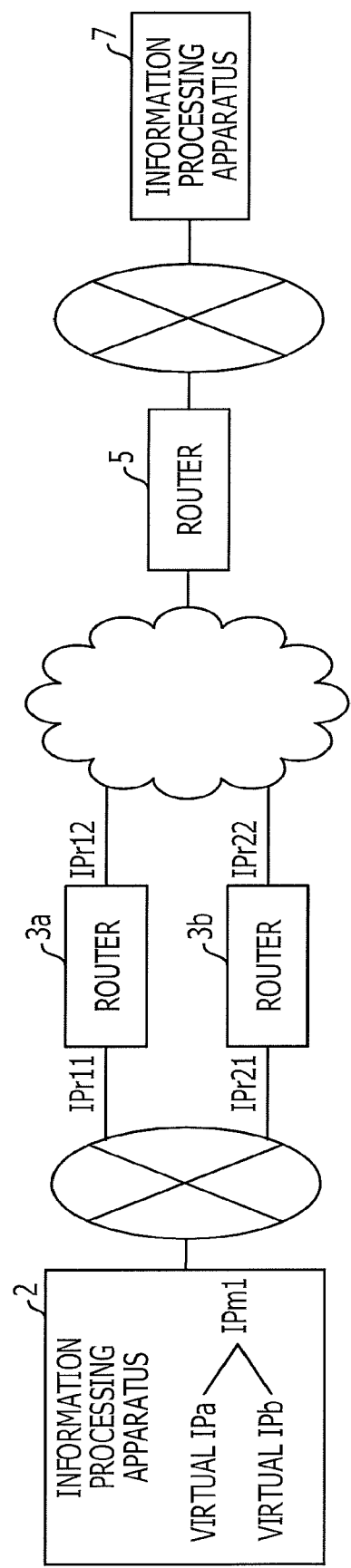
FIG. 1 is a view depicting a network configuration of a network in which a route is controlled utilizing a RIP.

FIG. 1 is a view depicting a network configuration of a network in which a route is controlled utilizing a RIP. For example, an information processing apparatus 2 that is a mainframe or the like has a virtual IP address a and another virtual IP address b, and, in the information processing apparatus 2, an application associated with each virtual IP address is being executed. An IP address of a local area network (LAN) adapter of the information processing apparatus 2 is a real IP address m1. A packet received by the LAN adapter is transferred to an application in accordance with a virtual IP address included in the packet.

The information processing apparatus 2 is coupled to a router 3a and another router 3b through a network such as a LAN. An IP address of the router 3a on the internal network side is an IP address r11, and an IP address of the router 3b on the internal network side is an IP address r21. An IP address of the router 3a on the external network side is an IP address r12, and an IP address of the router 3b on the external network side is an IP address r22.

A router 5 is installed between an external network such as the Internet and a LAN or the like to which another information processing apparatus 7 is coupled. The information processing apparatus 7 is a mainframe or the like that performs communication with the information processing apparatus 2.

In this manner, the route between the information processing apparatus 2 and the information processing apparatus 7 is multiplexed in preparation for a fault or the like.

The information processing apparatus 2 transmits RIP data relating to a plurality of virtual IP addresses to the network to implement communication between applications to which the virtual IP addresses are allocated and the information processing apparatus 7.

Here, it is assumed that the router 3a is set as a router of a primary system and the router 3b is set as a router of a sub system. In this case, the router 5 has such a routing table as depicted in FIG. 2. In the example of FIG. 2, the metric value of a route that passes the primary system router is 7 and the metric value of a route that passes the sub system router is 8. Since 1 is added to the metric value of the router 5, the metric value included in RIP data received by the router 5 is 6 in regard to the router 3a but is 7 in regard to the router 3b. It is to be noted that, in the present embodiment, it is assumed that a router adds a value to the metric value when the router registers RIP data into a routing table. Further, a route having the lowest metric value is selected in routing.

For example, the router 3a transmits such RIP data as depicted in FIG. 3A to the router 5 and the router 3b transmits such RIP data as depicted in FIG. 3B to the router 5. In the example in FIG. 3A, the metric value of the virtual IP address a is 6 and the metric value of the virtual IP address b is 6. In the example of FIG. 3B, the metric value of the virtual IP address a is 7 and the metric value of the virtual IP address b is 7.

It is assumed that the information processing apparatus 2 transmits such RIP data in which the metric value of the virtual IP address a is 5 and the metric value of the virtual IP address b is 5 as depicted in FIG. 4 to the routers 3a and 3b. In this case, if the router 3a adds 1 to the metric value and the router 3b adds 2 to the metric value, such RIP data as depicted in FIGS. 3A and 3B may be implemented. In this case, the routing table generated in the router 3a is such a routing table as depicted in FIG. 5A and the routing table generated in the router 3b is such a routing table as depicted in FIG. 5B.

By varying the value to be added to the metric value for each router in this manner, a priority degree may be set for each router (for example, for each route) even if an existing router is utilized. However, a primary system route relating to the virtual IP address a and a primary system route relating to the virtual IP address b are same as each other, and the network traffic is concentrated on the routes that pass the router 3a.

In the case where routing is performed such that a route of a main system and a route of a sub system relating to each virtual IP address are prepared and a route differs for each virtual IP address, the router 5 has such a routing table as depicted in FIG. 6. In the example of FIG. 6, in the case where the metric value associated with the virtual IP address a is 7, the router of a next hop is the router 3a, and in the case where the metric value associated with the virtual IP address a is 8, the router of a next hop is the router 3b. In the case where the metric value associated with the virtual IP address b is 7, the router of a next hop is the router 3b, and in the case where the metric value associated with the virtual IP address b is 8, the router of a next hop is the router 3a. Since 1 is added to the metric value of the router 5, the router 5 receives RIP data in which the metric value of the virtual IP address a is 6 and the metric value of the virtual IP address b is 7 from the router 3a and receives RIP data in which the metric value of the virtual IP address b is 6 and the metric value of the virtual IP address a is 7 from the router 3b.

For example, the router 3a transmits such RIP data as depicted in FIG. 7A to the router 5 and the router 3b transmits such RIP data as depicted in FIG. 7B to the router 5. In the example of FIG. 7A, the metric value of the virtual IP address a is 6 and the metric value of the virtual IP address b is 7. In the example of FIG. 7B, the metric value of the virtual IP address a is 7 and the metric value of the virtual IP address b is 6.

It is assumed that the information processing apparatus 2 transmits such RIP data in which the metric value of the virtual IP address a is 5 and the metric value of the virtual IP address b is 5 as depicted in FIG. 8 to the routers 3a and 3b. In this case, if the router 3a adds 1 to the metric value of the virtual IP address a and adds 2 to the metric value of the virtual IP address b and then the router 3b adds 2 to the metric value of the virtual IP address a and adds 1 to the metric value of the virtual IP address b, such RIP data as depicted in FIGS. 7A and 7B may be implemented. In this case, the routing table generated in the router 3a is such a routing table as depicted in FIG. 9A and the routing table generated in the router 3b is such a routing table as depicted in FIG. 9B.

If a value that differs for each virtual IP address may be added in each router, routing may be performed such that a primary system route and a sub system route relating to each virtual IP address are prepared and besides the route differs for each virtual IP address. However, since an existing router does not have such a function as described above, it is demanded to apply modification to each router.

Therefore, in the following, a method for allocating an appropriate communication route to each virtual IP address without performing setting of an addition value to each router is described.

Figure 10:
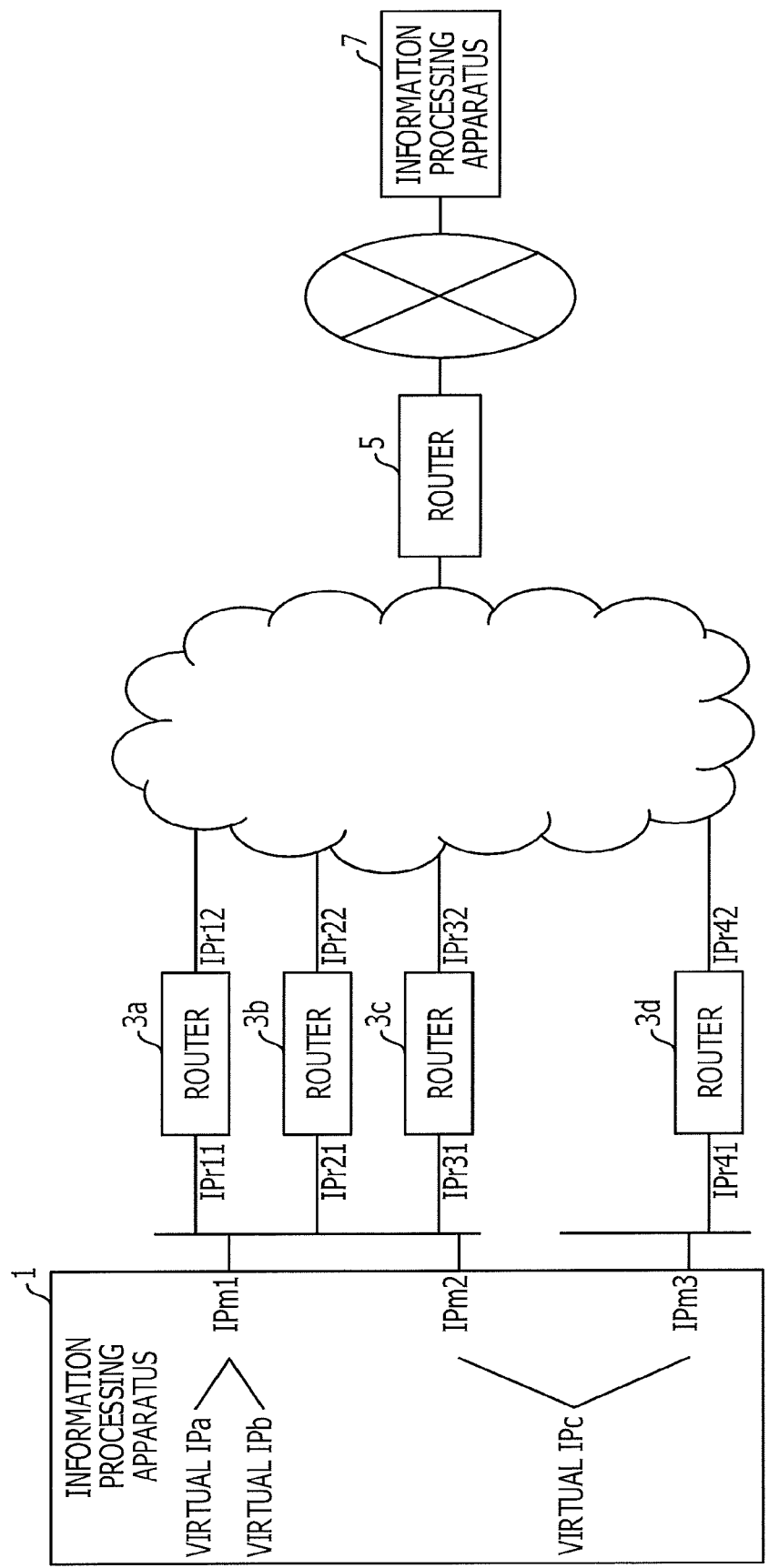
FIG. 10 is a block diagram depicting a network configuration according to a first embodiment.

FIG. 10 is a view depicting a network configuration of a first embodiment. An information processing apparatus 1 that executes main processes of the present embodiment has a virtual IP address a, another virtual IP address b, and a further virtual IP address c, and, in the information processing apparatus 1, an application associated with one of the virtual IP addresses is being executed. The information processing apparatus 1 includes three LAN adapters, and IP addresses of the LAN adapters are a real IP address m1, another real IP address m2, and a further real IP address m3. A packet received by any LAN adapter is passed to an application in accordance with a virtual IP address included in the received packet. It is to be noted that, while the number of virtual IP addresses in FIG. 10 is 3, the number of virtual IP addresses is not limited especially.

The information processing apparatus 1 is coupled to routers 3a to 3d through a network such as a LAN. The IP address of the router 3a on the internal network side is an IP address r11 and the IP address of the router 3b on the internal network side is an IP address r21, and the IP address of the router 3c on the internal network side is an IP address r31 and the IP address of the router 3d on the internal network side is an IP address r41. The IP address of the router 3a on the external network side is an IP address r12 and the IP address of the router 3b on the external network side is an IP address r22, and the IP address of the router 3c on the external network side is an IP address r32 and the IP address of the router 3d on the external network side is an IP address r42.

The router 5 is installed between an external network such as the Internet and a LAN or the like to which the information processing apparatus 7 is coupled. The information processing apparatus 7 is a mainframe or the like that performs communication with the information processing apparatus 1.

In this manner, the route between the information processing apparatus 1 and the information processing apparatus 7 is multiplexed in preparation for a fault or the like.

The information processing apparatus 1 implements communication between an application to which a virtual IP address is allocated and the information processing apparatus 7 by transmitting RIP data relating to a plurality of virtual IP addresses to the network.

Figure 11:
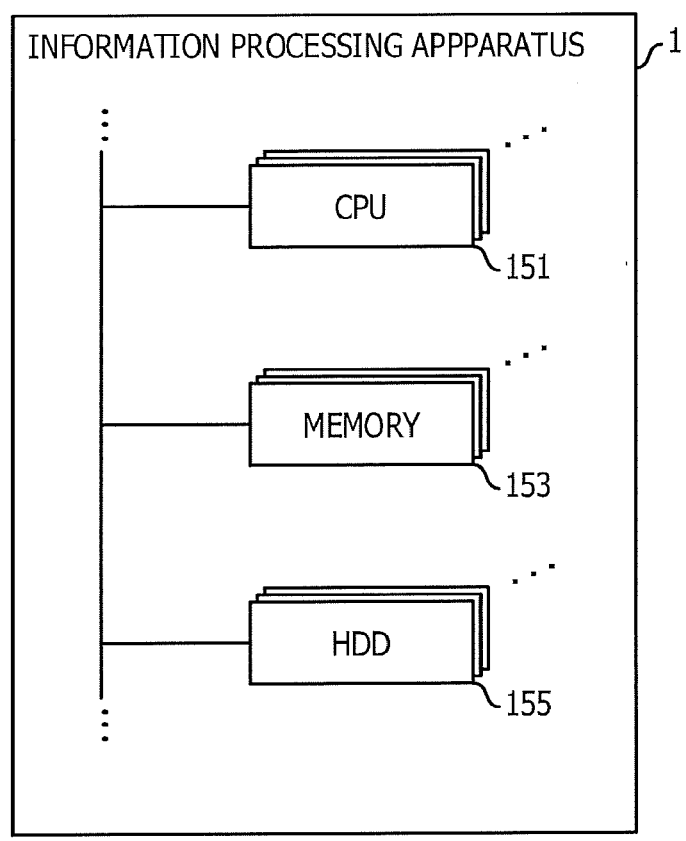
FIG. 11 is a block diagram depicting a hardware configuration of an information processing apparatus.

FIG. 11 is a block diagram depicting a hardware configuration of an information processing apparatus. The information processing apparatus illustrated in FIG. 11 may be the information processing apparatus 1 illustrated in FIG. 10. The information processing apparatus 1 includes one or a plurality of central processing units (CPUs) 151, one or a plurality of memories 153, and one or a plurality of hard disk drives (HDDs) 155. The hardware components are coupled to each other through a bus.

Figure 12:
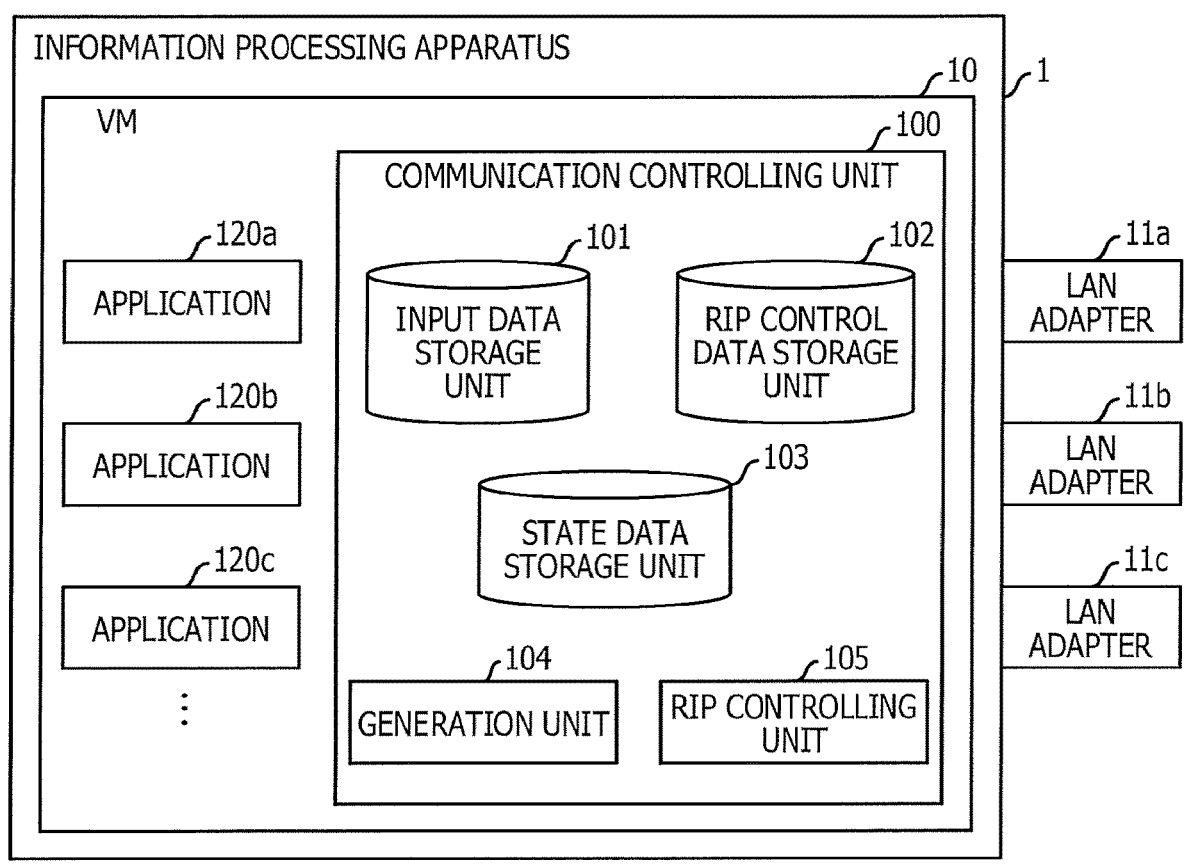
FIG. 12 is a functional block diagram of an information processing apparatus.

FIG. 12 is a functional block diagram of an information processing apparatus. The information processing apparatus illustrated in FIG. 12 may be the information processing apparatus 1 illustrated in FIG. 10. The information processing apparatus 1 executes a virtual machine (VM) 10, and the VM 10 executes applications 120a to 120c. Each of the applications 120a to 120c operates using a LAN adapter having a real IP address associated with a virtual IP address of the application as a router. A communication controlling unit 100 manages a plurality of virtual IP addresses, and each virtual IP address is allocated to one or a plurality of applications. LAN adapters 11a to 11c are attached or coupled to the information processing apparatus 1 through a cable or the like.

The communication controlling unit 100 includes an input data storage unit 101, a RIP controlling data storage unit 102, a state data storage unit 103, a generation unit 104, and a RIP controlling unit 105. The input data storage unit 101, the RIP controlling data storage unit 102, and the state data storage unit 103 are provided in a memory 153 or the HDD 155. The generation unit 104 and the RIP controlling unit 105 are implemented by the CPU 151 executing a program stored in the memory 153.

The generation unit 104 executes a process based on data stored in the input data storage unit 101 and stores a result of the processes into the RIP controlling data storage unit 102. The RIP controlling unit 105 executes a process based on data stored in the RIP controlling data storage unit 102 and data stored in the state data storage unit 103.

FIG. 13A is a view depicting an example of data stored in a RIP controlling data storage unit. The RIP controlling data storage unit illustrated in FIG. 13A may be the RIP controlling data storage unit 102 illustrated in FIG. 12. In the example of FIG. 13A, an IP address, an IP address of a transmission source and an IP address of a transmission destination on a transmission route of RIP data and a metric value are stored. As a remark, distinction between a primary system and a sub system is indicated.

It is to be noted that data to be stored into the RIP controlling data storage unit 102 is generated by the generation unit 104 based on one or a plurality of definition bodies stored in the input data storage unit 101. As depicted in FIG. 13B, each definition body includes an IP address (in the present embodiment, a virtual IP address), an IP address of a transmission source of the RIP data (in the present embodiment, a real IP address of the information processing apparatus 1), an IP address of a transmission destination of the RIP data (in the present embodiment, IP addresses r11 to r41 of the routers 3a to 3d), and a metric value. The definition bodies are inputted, for example, by a manager, and the metric values are set such that routes to be allocated to a plurality of virtual IP addresses are dispersed.

FIG. 14 is a view depicting an example of data stored in a state data storage unit. The state data storage unit illustrated by reference to FIG. 14 may be the state data storage unit 103 depicted in FIG. 12. In the example of FIG. 14, an IP address and information indicative of whether or not communication using the IP address may be performed are stored.

Now, a process executed by the RIP controlling unit 105 of the information processing apparatus 1 is described with reference to FIGS. 15 to 20.

Figure 15:
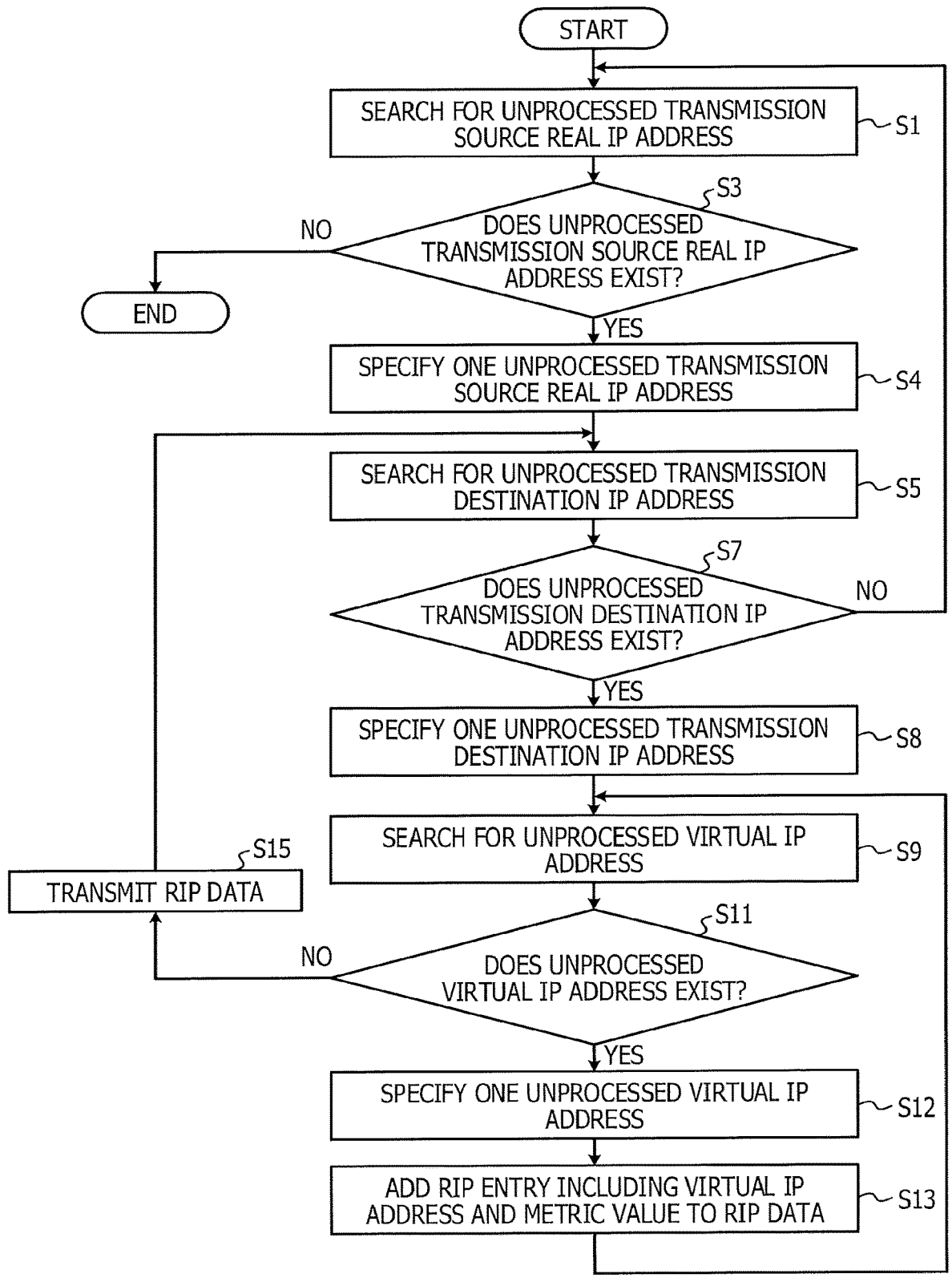
FIG. 15 is a flow chart depicting a processing flow of a process executed by a RIP controlling unit.

FIG. 15 is a view depicting a processing flow of a process executed by a RIP controlling unit. The RIP controlling unit illustrated by reference to FIG. 15 may be the RIP controlling unit 105 depicted in FIG. 12. For example, in the case where a transmission instruction of RIP data is accepted, the RIP controlling unit 105 of the information processing apparatus 1 searches for a transmission source real IP address that is not processed as yet in the RIP controlling data storage unit 102 (FIG. 15: step S1). At step S1, a search is performed in the field for a transmission source of a transmission route of RIP data in the RIP controlling data storage unit 102. The transmission instruction is issued, for example, periodically.

The RIP controlling unit 105 decides whether a transmission source real IP address that is not processed is detected (step S3).

In the case where an unprocessed transmission source real IP address does not exist in the RIP controlling data storage unit 102 (step S3: No route), the process ends.

In the case where an unprocessed transmission source real IP address exists in the RIP controlling data storage unit 102 (step S3: Yes route), the RIP controlling unit 105 specifies one unprocessed transmission source real IP address from within the RIP controlling data storage unit 102 (step S4).

The RIP controlling unit 105 searches for an unprocessed transmission destination IP address associated with the transmission source real IP address specified at step S4 (step S5). At step S5, a search is performed in the field for a transmission destination of a transmission route of RIP data in the RIP controlling data storage unit 102.

The RIP controlling unit 105 decides whether an unprocessed transmission destination IP address is detected (step S7).

In the case where an unprocessed transmission destination IP address does not exist in the RIP controlling data storage unit 102 (step S7: No route), the process returns to step S1.

In the case where an unprocessed transmission destination IP address exists in the RIP controlling data storage unit 102 (step S7: Yes route), the RIP controlling unit 105 specifies one unprocessed transmission destination IP address from within the RIP controlling data storage unit 102 (step S8).

The RIP controlling unit 105 searches for an unprocessed virtual IP address associated with a combination of the transmission source real IP address specified at step S4 and the transmission destination IP address specified at step S8 in the RIP controlling data storage unit 102 (step S9). At step S9, a search is performed in the field for a virtual IP address in the RIP controlling data storage unit 102. Further, at step S9, it is confirmed that the state registered in the state data storage unit 103 is "communicatable," and any virtual IP address that is not in a "communicatable" state is removed from a target of the search.

The RIP controlling unit 105 decides whether an unprocessed virtual IP address is detected (step S11).

In the case where an unprocessed virtual IP address does not exist in the RIP controlling data storage unit 102 (Step S11: No route), the RIP controlling unit 105 transmits the RIP data generated by the processes described above to the transmission destination IP address specified at step S8 (step S15). Then, the process returns to step S5.

On the other hand, in the case where an unprocessed virtual IP address exists in the RIP controlling data storage unit 102 (step S11: Yes route), the RIP controlling unit 105 specifies one unprocessed virtual IP address from within the RIP controlling data storage unit 102 (step S12).

The RIP controlling unit 105 adds a RIP entry that includes the virtual IP address specified at step S12 and a metric value associated with the virtual IP address to the RIP data (step S13). Then, the process returns to step S9.

Figure 16:
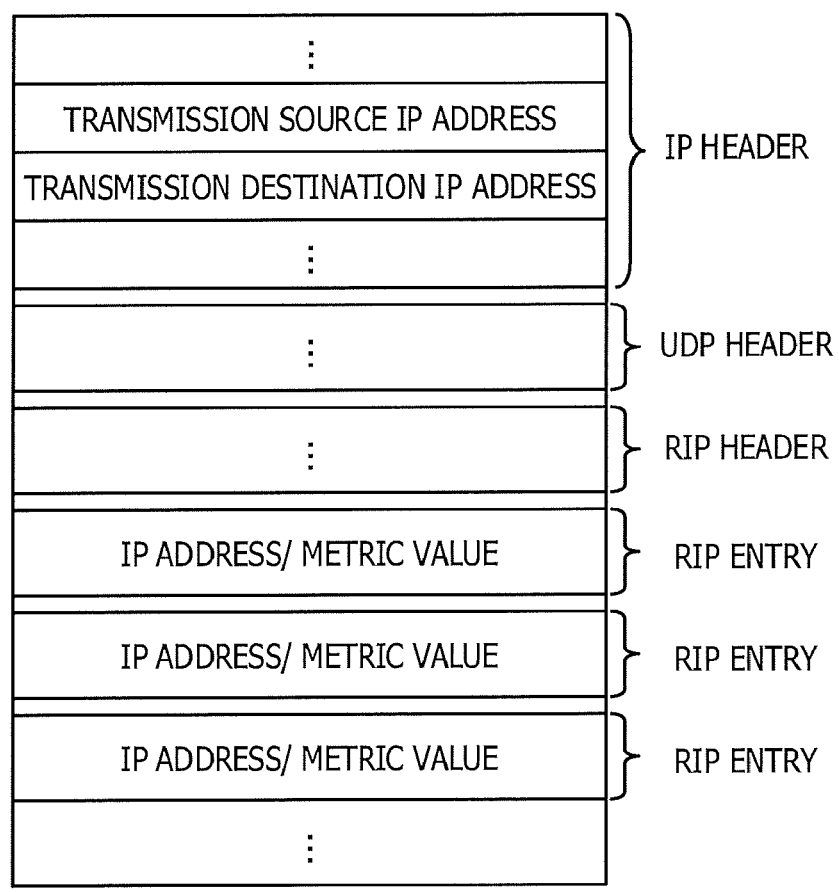
FIG. 16 is a view depicting an example of RIP data.

FIG. 16 is a view depicting an example of RIP data. In the example of FIG. 16, the RIP data includes an IP header including a transmission source IP address and a transmission destination IP address, a user datagram protocol (UDP) header, a RIP header, and one or a plurality of RIP entries. Each RIP entry includes an IP address (in the present embodiment, the virtual IP address specified at step S12) and a metric value. The transmission source IP address is the transmission source real IP address specified at step S4. The transmission destination IP address is the transmission destination IP address specified at step S8.

With such a present embodiment as described above, since primary system routes having virtual IP addresses different from each other may be used, the network traffic may be dispersed. Further, a plurality of routes in which a priority degree is set to each virtual IP address may be allocated.

In the following, a particular example of RIP entries transmitted from the information processing apparatus 1 to the routers 3a to 3d, a routing table the routers 3a to 3d have, RIP entries transmitted from the routers 3a to 3d to the router 5, and a routing table the router 5 has is described.

FIGS. 17A to 17D are views depicting examples of RIP entries transmitted from the information processing apparatus 1 to the routers 3a to 3d. FIG. 17A is a view depicting an example of a RIP entry transmitted from the information processing apparatus 1 to the router 3a; FIG. 17B is a view depicting an example of a RIP entry transmitted from the information processing apparatus 1 to the router 3b; FIG. 17C is a view depicting an example of a RIP entry transmitted from the information processing apparatus 1 to the router 3c; and FIG. 17D is a view depicting an example of a RIP entry transmitted from the information processing apparatus 1 to the router 3d.

As recognized from FIGS. 17A to 17D, different metric values are set individually to a plurality of routes to a same virtual IP address.

FIGS. 18A to 18D are views depicting examples of the routing tables the routers 3a to 3d have. FIG. 18A is a view depicting an example of the routing table the router 3a has; FIG. 18B is a view depicting an example of the routing table the router 3b has; FIG. 18C is a view depicting an example of the routing table the router 3c has; and FIG. 18D is a view depicting an example of the routing table the router 3d has.

FIGS. 19A to 19D are views depicting examples of RIP entries transmitted from the routers 3a to 3d to the router 5. For example, FIG. 19A is a view depicting an example of a RIP entry transmitted from the router 3a to the router 5; FIG. 19B is a view depicting an example of a RIP entry transmitted from the router 3b to the router 5; FIG. 19C is a view depicting an example of a RIP entry transmitted from the router 3c to the router 5; and FIG. 19D is a view depicting an example of a RIP entry transmitted from the router 3d to the router 5.

As may be recognized from FIGS. 19A to 19D, since a same value is added to individual metric values in the routers, the difference between metric values set in the information processing apparatus 1 is maintained.

FIG. 20 is a view depicting an example of the routing table the router 5 has. In the example of FIG. 20, in regard to the virtual IP address a, the metric value of the route that passes the router 3a is set to 7, and the metric value of the route that passes the router 3b is set to 8. In regard to the virtual IP address b, the metric value of the route that passes the router 3b is set to 7, and the metric value of the route that passes the router 3a is set to 8. In regard to the virtual IP address c, the metric value of the route that passes the router 3c is set to 7, and the metric value of the route that passes the router 3d is set to 8.

In this manner, the network traffic at the virtual IP address a and the virtual IP address b is dispersed to the route that passes the router 3a and the route that passes the router 3b, and the network traffic at the virtual IP address c is dispersed to the route that passes the router 3c and the route that passes the router 3d.

Embodiment 2

Although, in the first embodiment, a notification of a virtual IP address and a metric value the information processing apparatus 1 has is issued to a router using RIP data, the notification of an IP address and a metric value issued to the information processing apparatus 1 from a router may be issued to a different router.

Figure 21:
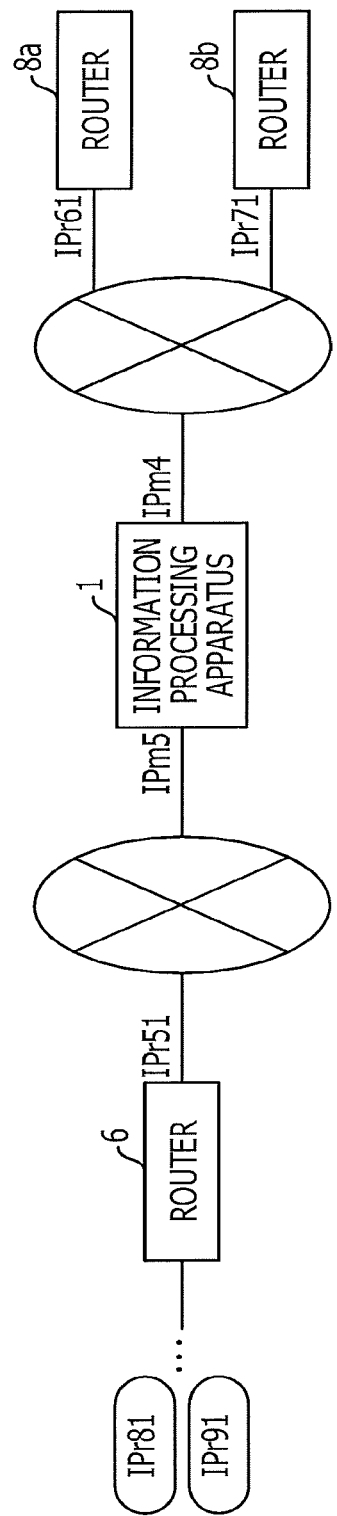
FIG. 21 is a block diagram depicting a network configuration of a second embodiment.

FIG. 21 is a view depicting a network configuration of a second embodiment. An information processing apparatus 1 is coupled to a router 6 and routers 8a and 8b through a network such as a LAN or the like. The IP address of the information processing apparatus 1 on the router 6 side is a real IP address m5, and the IP address of the information processing apparatus 1 on the routers 8a and 8b side is a real IP address m4. The IP address of the router 8a on the information processing apparatus 1 side is an IP address r61, and the IP address of the router 8b on the information processing apparatus 1 side is an IP address r71. The IP address of the router 6 on the information processing apparatus 1 side is an IP address r51. The router 6 may receive a packet from an apparatus of an IP address r81 and an apparatus of another IP address r91. In the second embodiment, routing control is performed such that a route allocated to the IP address r81 and a route allocated to the IP address r91 are different from each other.

FIG. 22 is a view depicting an example of data stored in a RIP controlling data storage unit in the second embodiment. In the example of FIG. 22, an IP address, an IP address of a transmission source and an IP address of a transmission destination on a transmission route of RIP data, and a metric value are stored. As a remark, distinction between a primary system and a sub system is indicated. In the field for an IP address, an IP address predicted to be notified of using RIP data is set in advance.

In the following, a particular example of a RIP entry transmitted from the router 6 to the information processing apparatus 1, a routing table managed by the information processing apparatus 1, a RIP entry transmitted from the information processing apparatus 1 to the router 8a and the router 8b, and a routing table the router 8a and the router 8b have are described.

FIG. 23 is a view depicting an example of a RIP entry transmitted from the router 6 to the information processing apparatus 1. In the example in FIG. 23, both the metric value of the IP address r81 and the metric value of the IP address r91 are 1.

As may be recognized from FIG. 23, in RIP data received by the information processing apparatus 1, the metric values of a plurality of IP addresses are same.

FIG. 24 is a view depicting an example of the routing table managed by the information processing apparatus 1. In the example of FIG. 24, an IP address, an IP address of a next hop, and a metric value are stored. In the second embodiment, the routing table depicted in FIG. 24 corresponds to data in the state data storage unit 103 in the first embodiment. An IP address whose metric value is one of integers from 1 to 15 indicates a "communicatable" state, and an IP address whose metric value is 16 indicates a "non-communicatable" state.

FIGS. 25A and 25B are views depicting examples of RIP entries transmitted from the information processing apparatus 1 to the routers 8a and 8b. FIG. 25A is a view depicting a RIP entry transmitted from the information processing apparatus 1 to the router 8a, and FIG. 25B is a view depicting a RIP entry transmitted from the information processing apparatus 1 to the router 8b.

As may be recognized from FIGS. 25A and 25B, the metric value of the IP address r81 and the metric value of the IP address r91 are set independently of RIP data received by the information processing apparatus 1. Further, the metric value of the IP address r81 and the metric value of the IP address r91 are set so as to be different from each other. Since the information processing apparatus 1 re-sets the metric values in this manner, it is possible to make the route to the IP address r81 and the route to the IP address r91 different from each other.

FIGS. 26A and 26B are views depicting routing tables the routers 8a and 8b have. FIG. 26A is a view depicting the routing table the router 8a has, and FIG. 26B is a view depicting a routing table the router 8b has.

As may be recognized from FIGS. 26A and 26B, in both of the routers 8a and 8b, 1 is added to the metric values. Accordingly, the difference between metric values set in the information processing apparatus 1 is maintained.

If such processes as described above are executed, an appropriate route may be allocated to each of a plurality of IP addresses notified of from a router to the information processing apparatus 1. For example, the network traffic between the router 6 and the apparatus of the IP address r81 and between the router 6 and the apparatus of the IP address r91 may be dispersed.

Although the embodiments of the present technology have been described, the present technology is not limited to the embodiments. For example, the functional block configuration of the information processing apparatus 1 described hereinabove may not coincide with an actual program module configuration.

Further, the configuration of each table described above is an example, and each table may have a different configuration from such a configuration as described above. Further, also in any of the processing flows, it is possible to change the order of processes if a same processing result is obtained. Furthermore, the processes may be executed in parallel.

The embodiments of the present technology described above may be summarized in the following manner.

The information processing apparatus according to a first aspect of the present embodiment includes (A) a data storage unit (the RIP controlling data storage unit 102 in the embodiments is an example of the data storage unit) that stores, in an associated relationship with each of a plurality of virtual IP addresses used by the information processing apparatus, a first metric value regarding a first route along which a packet destined for the virtual IP address is transferred and a second metric value regarding a second route along which a packet destined for the virtual IP address is transferred, and (B) a transmission unit (the RIP controlling unit 105 in the embodiments is an example of the transmission unit) that transmit the data stored in the data storage unit to a network apparatus on a route along which a packet destined for the plurality of virtual IP addresses is transferred.

It becomes possible to allocate an appropriate route to each virtual IP address without performing setting for weighting of a metric value to the network apparatus. Further, by allocation of an appropriate route, it becomes possible to disperse the network traffic.

In addition, the data storage unit (a1) may further store, in an associated relationship with each of the plurality of virtual IP addresses, an IP address of a network apparatus on the route along which a packet destined for the virtual IP address is transferred. Further, the transmission unit (b1) may generate, in regard to each of the plurality of virtual IP addresses, routing data including the virtual IP address, a first metric value, and a second metric value and transmit the routing data so as to be destined for the IP address of the network on the route along which a packet destined for the virtual IP address is transferred.

Since it becomes possible to send minimal data to each network apparatus, increase of the network traffic may be suppressed.

Further, each of the plurality of virtual IP addresses may be allocated to one or at least one of a plurality of applications to be executed by the information processing apparatus.

It becomes possible for each application to use an appropriate route for communication.

Further, the first route may be a route of a primary system and the second route may be a route of a sub system.

The information processing method according to a second aspect of the present embodiment includes processes for (C) reading out data from a data storage unit that stores, in an associated relationship with each of a plurality of virtual IP addresses used by a computer, a first metric value regarding a first route along which a packet destined for the virtual IP address is transferred and a second metric value regarding a second route along which a packet destined for the virtual IP address is transferred, and (D) transmitting the read out data to a network apparatus on a route along which a packet destined for the plurality of virtual IP addresses is transferred.

It is to be noted that a program for causing a computer to execute the processes according to the method described above, and the program is stored in a computer-readable storage medium or storage apparatus such as a flexible disk, a compact disc read-only memory (CD-ROM), a magneto-optical disk, a semiconductor memory, a hard disk or the like. It is to be noted that an intermediate processing result is temporarily stored into a storage apparatus such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    a memory; and
    circuitry coupled to the memory and configured to:
        transmit first information and second information via a first route, the first information including a first metric value and a first address, the second information including a second metric value and a second address; and
        transmit third information and fourth information via a second route, the third information including a third metric value and the first address, the fourth information including a fourth metric value and the second address;
    wherein a first value is to be added to the first metric value and the second metric value by a first router in the first route and a second value is to be added to the third metric value and the fourth metric value by a second router in the second route,
    wherein the first metric value, the second metric value, the third metric value, and the fourth metric value are used for determining each primary route of the first address and the second address,
    wherein each value of the first metric value, the second metric value, the third metric value, and the fourth metric value transmitted from the information processing apparatus is to be set so that a first primary route for the first address and a second primary route for the second address are different routes,
    wherein the first primary route is a second sub route which is used when a fault is occurred in the second primary route for the second address, and
    wherein the second primary route is a first sub route which is used when a fault is occurred in the first primary route for the second address.

2. The information processing apparatus according to claim 1, the circuitry further configured to:
    allocate the first address to a first application; and
    allocate the second address to a second application.

3. The information processing apparatus according to claim 2, circuitry further configured to generate, for each of the first address and the second address, routing data that associates the first metric value, the second metric value, the third metric value, and the forth metric value, an Internet Protocol address of the first router on the first route, and an Internet Protocol address of the second router on the second route with each other.

4. The information processing apparatus according to claim 1,
    wherein the first address is a first virtual Internet Protocol address, and
    wherein the first virtual Internet Protocol address is allocated to one or more applications to be executed by the information processing apparatus.

5. The information processing apparatus according to claim 1,
    wherein the first route is a route of a primary system for the first address and the second route is a route of a sub system for the first address,
    wherein the second route is a route of a primary system for the second address and the first route is a route of a sub system for the second address, and
    wherein the first metric value is lower than the third metric value and the fourth metric value is lower than the second metric value.

6. The information processing apparatus according to claim 1, wherein the added first metric value to which the first value was added is transmitted to a next network apparatus on the first route.

7. A computer-implemented route control method comprising:
    transmitting first information and second information via a first route, the first information including a first metric value and a first address, the second information including a second metric value and a second address; and
    transmitting third information and fourth information via a second route, the third information including a third metric value and the first address, the fourth information including a fourth metric value and the second address
    wherein a first value is to be added to the first metric value and the second metric value by a first router in the first route and a second value is to be added to the third metric value and the fourth metric value by a second router in the second route,
    wherein the first metric value, the second metric value, the third metric value, and the fourth metric value are used for determining each primary route of the first address and the second address,
    wherein each value of the first metric value, the second metric value, the third metric value, and the fourth metric value transmitted from the information processing apparatus is to be set so that a first primary route for the first address and a second primary route for the second address are different routes,
    wherein the first primary route is a second sub route which is used when a fault is occurred in the second primary route for the second address, and
    wherein the second primary route is a first sub route which is used when a fault is occurred in the first primary route for the second address.

8. The route control method according to claim 7, further comprising:
    allocating the first address to a first application; and
    allocating the second address to a second application.

9. The route control method according to claim 8, further comprising: generating, for each of the first address and the second address, routing data that associates the first metric value, the second metric value, the third metric value, and the fourth metric value, an Internet Protocol address of the first router on the first route, and an Internet Protocol address of the second router on the second route with each other.

10. The route control method according to claim 7,
wherein the first address is a first virtual Internet Protocol address, and
wherein the first virtual Internet Protocol address is allocated to one or more applications to be executed by the information processing apparatus.

11. The route control method according to claim 7,
wherein the first route is a route of a primary system for the first address and the second route is a route of a sub system for the first address,
wherein the second route is a route of a primary system for the second address and the first route is a route of a sub system for the second address, and
wherein the first metric value is lower than the third metric value.

12. The route control method according to claim 7, wherein the added first metric value to which the first value was added is transmitted to a next network apparatus on the first route.

13. A non-transitory computer-readable medium storing a route control program that causes an information processing apparatus to execute a process comprising:
transmitting first information and second information via a first route, the first information including a first metric value and a first address, the second information including a second metric value and a second address; and
transmitting third information and fourth information via a second route, the third information including a third metric value and the first address, the fourth information including a fourth metric value and the second address
wherein a first value is to be added to the first metric value and the second metric value by a first router in the first route and a second value is to be added to the third metric value and the fourth metric value by a second router in the second route,
wherein the first metric value, the second metric value, the third metric value, and the fourth metric value are used for determining each primary route of the first address and the second address,
wherein each value of the first metric value, the second metric value, the third metric value, and the fourth metric value transmitted from the information processing apparatus is to be set so that a first primary route for the first address and a second primary route for the second address are different routes,
wherein the first primary route is a second sub route which is used when a fault is occurred in the second primary route for the second address, and
wherein the second primary route is a first sub route which is used when a fault is occurred in the first primary route for the second address.

14. A system comprising:
a first communication apparatus configured to:
transmit a first information and a second information via a first route, the first information including a first metric value and a first address, the second information including a second metric value and a second address, and
transmit a third information and a fourth information via a second route, the third information including a third metric value and the first address, the fourth information including a fourth metric value and the second address,
a first router in the first route configured to:
receive the first information and the second information,
add a first value to the first metric value and the second metric value, and
transmit the first information and the second information, the first information including the first address and the first metric value to which the first value is added, the second information including the second address and the second metric value to which the first value is added,
a second router in the second route configured to:
receive the third information and the fourth information,
add a second value to the third metric value and the fourth metric value, and
transmit the third information and the fourth information, the first information including the first address and the third metric value to which the second value is added, the third information including the second address and the fourth metric value to which the second value is added, and
a second communication apparatus configured to:
receive the first information and the second information via the first route,
receive the third information and the fourth information via the second route,
determine a first primary route for the first address by comparing the first metric value and the third metric value, and
determine a second primary route for the second address by comparing the second metric value and the fourth metric value,
wherein each value of the first metric value, the second metric value, the third metric value, and the fourth metric value transmitted from the first communication apparatus is to be set so that the first primary route and the second primary route are different routes,
wherein the first primary route is a second sub route which is used when a fault is occurred in the second primary route for the second address, and
wherein the second primary route is a first sub route which is used when a fault is occurred in the first primary route for the second address.

* * * * *